US006556683B1

(12) United States Patent
Levreault

(10) Patent No.: US 6,556,683 B1
(45) Date of Patent: Apr. 29, 2003

(54) REMOTE TURN-ON CIRCUIT FOR AUTOMOBILE AUDIO AMPLIFIER

(76) Inventor: John E. Levreault, 53 Highland Rd., Boxford, MA (US) 01921

(*) Notice: Subject to any disclaimer, the term of this patent is extended or adjusted under 35 U.S.C. 154(b) by 0 days.

(21) Appl. No.: 09/226,474

(22) Filed: Jan. 7, 1999

(51) Int. Cl.[7] .................................................. H04B 1/00

(52) U.S. Cl. ......................... 381/86; 381/120; 455/343; 455/345

(58) Field of Search .......................... 381/86, 107, 120; 455/343, 345

(56) References Cited

U.S. PATENT DOCUMENTS 4,245,348 A * 1/1981 Imazeki ................... 455/154.2
4,380,767 A * 4/1983 Goldstein et al. ........... 343/745
4,933,987 A * 6/1990 Parks ......................... 381/107

* cited by examiner

*Primary Examiner*—Ping Lee
(74) *Attorney, Agent, or Firm*—Tod R. Nissle, P.C.

(57) ABSTRACT

A system for installing a radio audio amplifier in a vehicle at a location remote from the vehicle radio. The system senses voltage in the radio speaker wires to turn the amplifier on and off.

1 Claim, 2 Drawing Sheets

REMOTE TURN-ON CIRCUIT FOR AUTOMOBILE AUDIO AMPLIFIER

Figure 1:
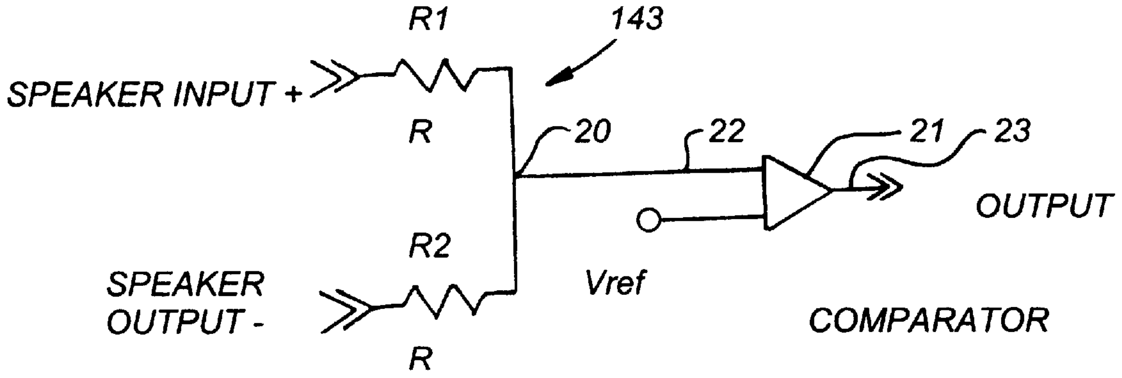

This invention relates to amplifiers.

More particularly, the invention relates to an audio amplifier installed in an automobile or other vehicle.

In a further respect, the invention relates to a system for turning a radio audio amplifier in a vehicle on or off.

In still a further respect, the invention relates to a system for installing a radio audio amplifier in a vehicle at a location remote from the radio and for sensing voltage in the radio speaker wires to turn the amplifier on and off.

An audio speaker is a device that receives a signal and produces sound. The signal received by a speaker typically, but not necessarily, is an electric signal produced by an audio amplifier. The speaker receives the amplifier signal and produces vibrations which produce sound.

High power audio amplifiers are frequently added to an entertainment system in an automobile or other vehicle to amplify the audio output from a radio mounted in the vehicle. These high-power amplifiers are usually housed in a chassis or enclosure different from the radio, and they are frequently mounted in a location that is not near the radio. When the vehicle is turned off and the radio is not in use, a means must be found to deactivate the amplifier so that the amplifier will not drain the vehicle's battery.

Automobile radios typically provide a "remote output" signal that supplies a signal voltage. The strength of the signal voltage is equal to the battery voltage. The remote output signal is used to activate and deactivate a power antenna, an externally-mounted amplifier, and other remote devices associated with the radio. A separate "carrier" wire is connected to and intermediate the radio and remote device to receive and carry the remote output signal from the radio to the remote device. A disadvantage associated with using such a carrier wire is that if a remote device is incorporated after the radio has been installed in the vehicle, the remote output signal is not usually accessible without removing the radio from the dash, an expensive and time-consuming operation, which adds to the installation cost for the remote device.

Many amplifiers accept as their input signal the voltage on the radio speaker cables that are already installed in a vehicle. Some manufacturers have attempted to turn a remote amplifier on and off by detecting the presence of an audio signal on these speaker cables. A disadvantage of this procedure is that when the vehicle radio is turned on or off, the clicks and thumps that normally occur on the speaker cables may be misinterpreted as a valid audio signal, activating the remote amplifier and possibly damaging a loudspeaker connected to the remote amplifier.

Accordingly, it would be highly desirable to provide an improved apparatus and method for turning on and off a remote amplifier mounted in a vehicle and associated with a radio also mounted in the vehicle.

Therefore, it is a principal object of the invention to provide an improved method and apparatus for installing in a vehicle an amplifier which is remote from but is operatively associated with a radio also installed in the vehicle.

Another object of the invention is to provide an improved method and apparatus for turning an amplifier on and off.

Figure 2:
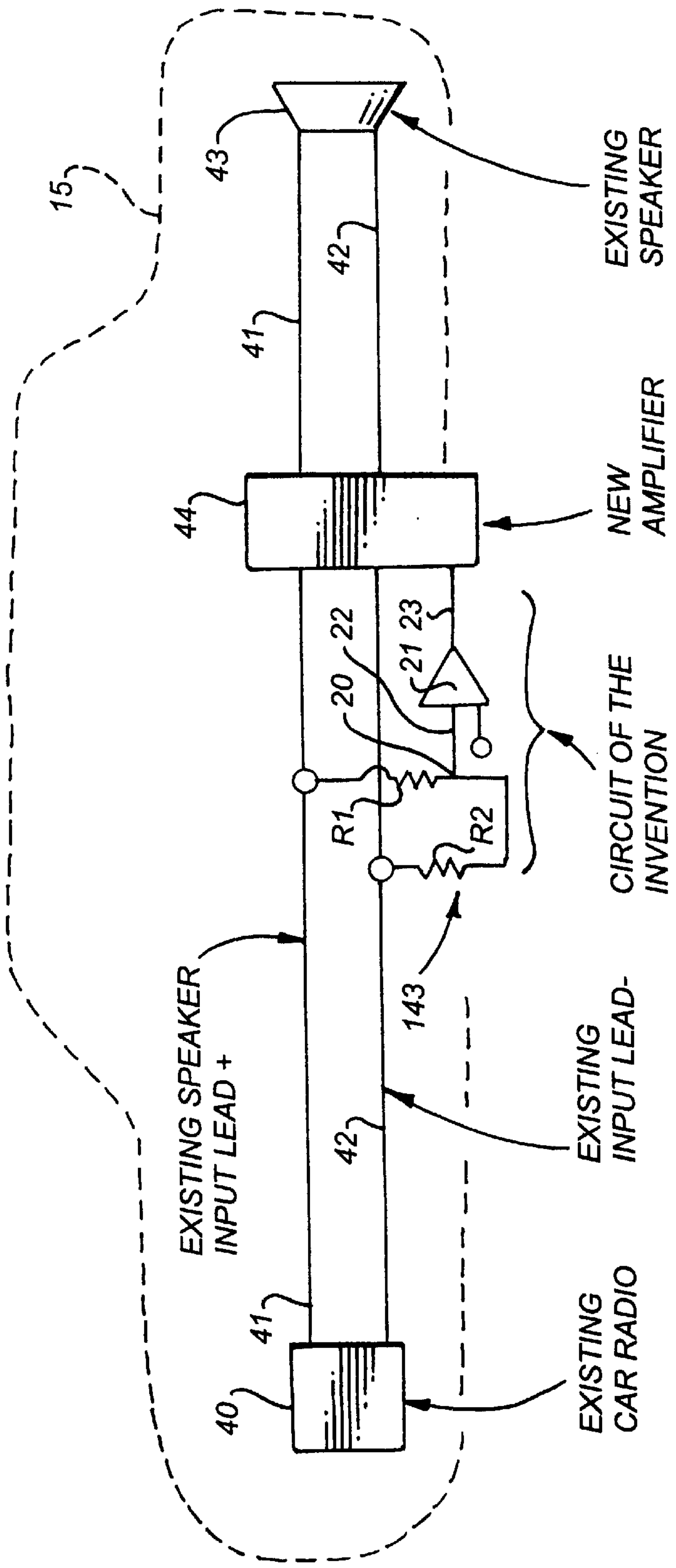

These and other, further and more specific objects and advantages of the invention will be apparent to those skilled in the art from the following detailed description thereof, take in conjunction with the drawings, in which:

FIG. 1 illustrates a circuit constructed in accordance with the principles of the invention; and, FIG. 2 illustrates a radio system including the circuit of the invention.

Briefly, in accordance with my invention, I provide an improvement for a vehicle. The vehicle includes a frame; a radio mounted on the frame and producing a signal including an audio component and a DC component; an audio speaker mounted on the frame; and, a pair of speaker wires extending from the radio to the speaker to receive the signal from the radio and deliver a speaker signal to the speaker. The improvements comprise amplifying apparatus for amplifying the signal. The amplifying apparatus includes an amplifier mounted on the frame spaced apart from the radio; and, a control apparatus attached to the speaker wires and to the amplifier for turning the amplifier on and off. The control apparatus receives the signal from the speaker wires, separates the DC component from the audio component, and uses the DC component to turn the amplifier on and off.

In another embodiment of the invention, I provide apparatus for turning an amplifier on and off. The apparatus is used in combination with a vehicle. The vehicle includes a frame; a radio mounted on the frame and producing a signal including an audio component and a DC component; an audio speaker mounted on the frame; a pair of speaker wires extending from the radio to the speaker to receive the signal from the radio and deliver a speaker signal to the speaker; and, an amplifier mounted on the frame to amplify the signal. The apparatus for turning the amplifier on and off comprises an electrical circuit connected in parallel to the speaker wires. The circuit includes a first leg including a first proximate end connected to one of the speaker wires and including a first resistor and a distal end; and, a second leg including a second proximate end connected to the other of the speaker wires and including a second resistor and a distal end. The distal end of the first leg co-terminates with the distal end of the second leg at a junction. The circuit also includes a third leg having a proximate end connected to the junction to receive the DC signal produced at the junction, and a distal end connected to a comparator. The comparator is connected to the amplifier and turns on the amplifier when the DC signal is of a magnitude greater than a selected magnitude.

In a further embodiment of the invention, I provide a method for turning an amplifier on in a vehicle. The vehicle includes a frame; a radio mounted on the frame and producing a signal including an audio component and a DC component; a speaker mounted on the frame and connected to the amplifier; a pair of speaker wires each extending from the radio to the speaker to receive the signal from the radio and deliver a speaker signal to the speaker; and, an amplifier mounted on the frame to amplify the signal. The improved method includes the step of connecting an electrical circuit intermediate the speaker wires and the amplifier. The electrical circuit receives the signal from the speaker wires, separates the DC component of the signal, and utilizes the DC component to turn the amplifier on.

Turning now to the drawings, which depict the presently preferred embodiments of the invention for purpose of illustrating the invention and not by way of limitation of the scope of the invention, and in which like reference characters refer to corresponding elements throughout the several views, FIG. 1 illustrates a circuit constructed in accordance with the principles of the invention, and generally indicated by reference character 143. The circuit 143 includes a first leg. The first leg includes a proximate end connected to "SPEAKER INPUT +". The proximate end of a second leg in circuit 143 is connected to "SPEAKER INPUT −". The first leg includes a resistor R1. The second leg includes a resistor R2. Resistor R1 has a resistance equal to that of resistance R2.

The "SPEAKER INPUT +" includes an audio input superimposed on DC (direct current). The voltage in the first leg is typically, but not necessarily, six volts. The "SPEAKER INPUT −" includes an audio input supposed on DC (direct current). The voltage in the second leg is typically, but not necessarily, six volts.

The distal end of the first leg and the distal end of the second leg co-terminate at junction 20. The proximate end of a third leg 22 co-terminates with the distal end of the first leg and the distal end of the second leg at junction 20. The distal end of leg 22 is connected to comparator 21. Vref is connected to comparator 21. The "OUTPUT" of comparator 21 is connected to an amplifier, like the amplifier 44 in FIG. 2.

FIG. 2 illustrates a radio system in an automobile or other vehicle 15. The positive speaker lead 41 and the negative speaker lead 42 extend from radio 40 to speaker 43. Leads 41, 42 receive a signal from radio 40 and deliver a speaker signal to speaker 43. An amplifier 44 is interposed in speaker leads 41, 42 between radio 40 and speaker 43. Amplifier 44 can be installed in vehicle 15 at the same time as, or at a later time than, radio 40 and speaker leads 41 and 42. Circuit 143 is interposed in parallel with leads 41, 42 in the radio system and is interposed intermediate speaker leads 41, 42 and amplifier 44. When amplifier 44 is interposed in speaker leads 41 and 42, the speaker signal which travels from radio 40 to speaker 43 via leads 41 and 42 is enhanced by amplifier 44.

The majority of automobile and truck radios on the market today use "bridged output" integrated circuit (IC) amplifiers. Such IC amplifiers have two separate output leads (a positive lead 41 and a negative lead 42), each one carrying an audio component. The audio component comprises the audio output signal. The audio output signal in lead 41 is in anti-phase to the audio output signal in lead 42. In addition, each output lead 41, 42 will usually have a DC component. The DC component consists of an idle (no audio) DC output with a voltage level equal to about six volts, i.e., equal to about one-half the battery voltage. The audio output signal to each lead 41, 42 is superimposed on that DC output. The audio output signal in lead 41 is 180° out-of-phase with the audio output signal in lead 42. The circuit 143 uses the DC component to turn amplifier on and off in the manner described below.

The circuit 143 functions such that at junction 20 the audio signals in leads 41 and 42 are "nulled out", separating out and leaving only the DC output voltage of six volts on leg 22 to electronic comparator 21. The Vref voltage value is selected to be somewhat less than six volts so that when the comparator 21 senses six volts on leg 22, comparator 21 compares the six volt signal on leg 22 with Vref, determines that the radio 43 is on because six volts is greater than the selected Vref voltage value, and outputs on leg 23 an activation signal to amplifier 44 or to a switch means intermediate amplifier 44 and the vehicle battery. The activation signal operates a mechanical switch, a circuit controlling a mechanical switch, an electronic switch, or any other desired switch means for permitting amplifier 44 to be turned on to begin operation.

When the comparator senses on leg 22 a voltage which is significantly less than six volts (i.e., when radio 40 is turned off), then the comparator 21 compares the voltage signal on leg 22 with the selected Vref voltage value, determines that the voltage on leg 22 is less than Vref, and outputs on leg 23 a deactivation signal to amplifier 44 or to a switch means intermediate amplifier 44 and the vehicle battery. The deactivation signal causes amplifier 44 to be turned off by operating a mechanical switch, a circuit controlling a mechanical switch, an electronic switch, or any other desired switch control means utilized to turn amplifier 44 off.

When amplifier 44 is on, it is in an active, power consuming state. When amplifier 44 is off, it is in an inactive "sleep" mode, drawing little or no power from the vehicle battery. The vehicle battery and the electrical connections between amplifier 44 and the battery are well known in the art, and are omitted from the drawings for the sake of clarity.

Circuit 143 is easily implemented using commonly available electronic components of low cost. By using this circuit, an amplifier 44 can be easily switched on or off automatically with the radio 40 by simply adding this circuit in parallel with the speaker leads 41, 42 (and intermediate speaker leads 41, 42 and amplifier 44 in the manner shown in FIG. 2) coming from the radio 40, which normally provides the source signal for the amplifier 44. It is not necessary to remove the radio in order to gain access to the "remote output" lead which has traditionally been used to turn amplifier 44 on and off. The circuit 143 and installation method of the invention reduces the installation time required to add an amplifier 44 to a car audio system, thus lowering the installation cost. Amplifier 44 is often a high-power amplifier.

Having described my invention in such terms as to enable those skilled in the art to understand and practice it, and having identified the presently preferred embodiments thereof.

I claim:

1. In combination with a vehicle including a frame, a radio mounted on the frame and producing a signal including an audio component and a DC component, a speaker mounted on the frame, a pair of speaker wires extending from the radio to the speaker to receive the signal from the radio and deliver a speaker signal to the speaker, and an amplifier mounted on the frame to amplify the signal, the improvements for turning the amplifier on and off and comprising an electrical circuit connected in parallel to said speaker wires, said circuit including (a) a first leg including a first proximate end connected to one of said speaker wires and including a first resistor and a distal end;

(b) a second leg including a second proximate end connected to the other of said speaker wires and including a second resistor and a distal end, said distal end of said first leg co-terminating with said distal end of said second leg at a junction;

(c) a third leg having (i) a proximate end connected to said junction to receive the DC signal produced at said junction, and (ii) a distal end connected to comparator means, said comparator means being connected to the amplifier and turning on the amplifier when the DC signal is of a magnitude greater than a selected magnitude.

* * * * *